Dec. 18, 1928.                                          1,695,871
C. J. WALKER ET AL
AUTOMOBILE SEAT CONSTRUCTION
Filed Dec. 6, 1926            2 Sheets-Sheet 1

INVENTORS
Clarence J. Walker
BY George F. Trautwein
Warren D. House
Their ATTORNEY.

Witness:
R. E. Hamilton

Dec. 18, 1928.  
C. J. WALKER ET AL  
1,695,871  
AUTOMOBILE SEAT CONSTRUCTION  
Filed Dec. 6, 1926  2 Sheets-Sheet 2
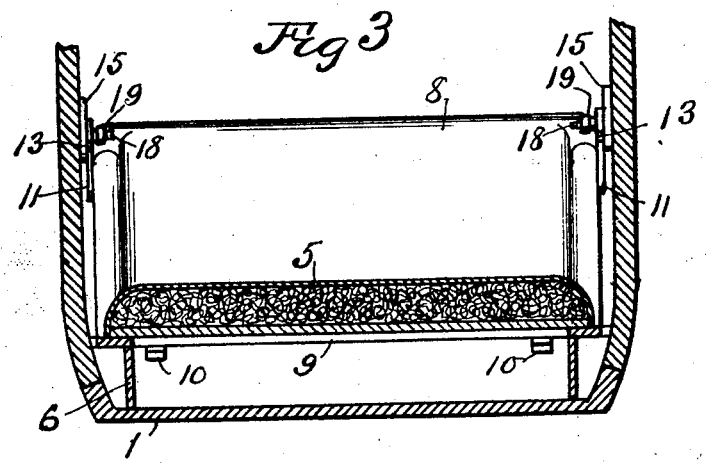
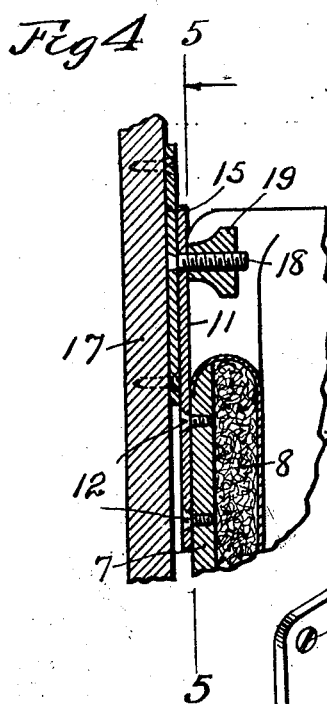
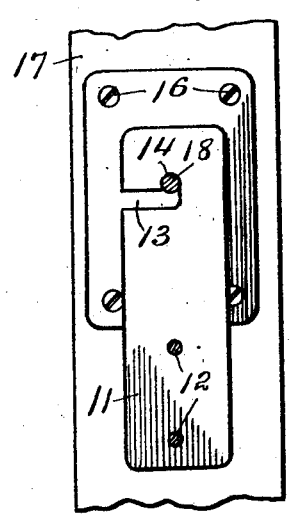
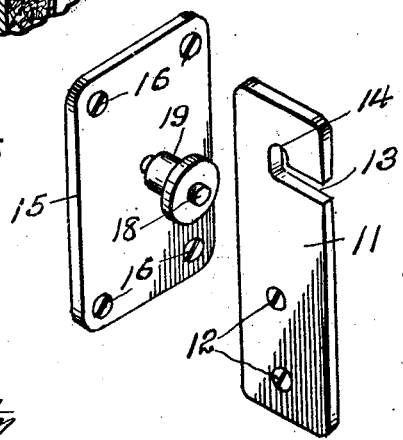
INVENTORS  
Clarence J. Walker  
George F. Trautwein  
BY Warren D. House.  
Their ATTORNEY.
witness:  
R. E. Hamilton Patented Dec. 18, 1928.

1,695,871

UNITED STATES PATENT OFFICE.

CLARENCE J. WALKER, OF SALINA, KANSAS, AND GEORGE F. TRAUTWEIN, OF KANSAS CITY, MISSOURI.

AUTOMOBILE SEAT CONSTRUCTION.

Application filed December 6, 1926. Serial No. 152,868.

Our invention relates to improvements in automobile seat constructions.

One of the objects of our invention is to provide in an automobile a novel seat construction by means of which the back of the front seat may be easily and quickly disposed so as to form with the front seat cushion and back seat cushion a comfortable bed.

A further object of our invention is the provision of novel fastening means for releasably attaching the front seat back to the automobile body when the seat back is in its upright position.

Still another object of our invention is to provide a novel structure of the kind described, which is simple, cheap, durable, not liable to get out of order, which may be readily adapted to automobiles now in use, and in which the seat back attaching means is particularly well adapted for application to closed cars, and in which the attaching means is disposed with its projecting portions located above the upper edge of the seat back, so as not to be in the way of nor interfere with the free movements of the occupant of the seat.

The novel features of our invention are hereinafter fully described and claimed.

In the accompanying drawings, which illustrate the preferred embodiment of our invention, Fig. 1 is a side view, partly in elevation and partly in vertical section, of an automobile body of the closed car type which is provided with our improvement, the front seat back being shown in the upright position.

Fig. 3 is a sectional view on the line 3—3 of Fig. 1.

Figures 1, 2:
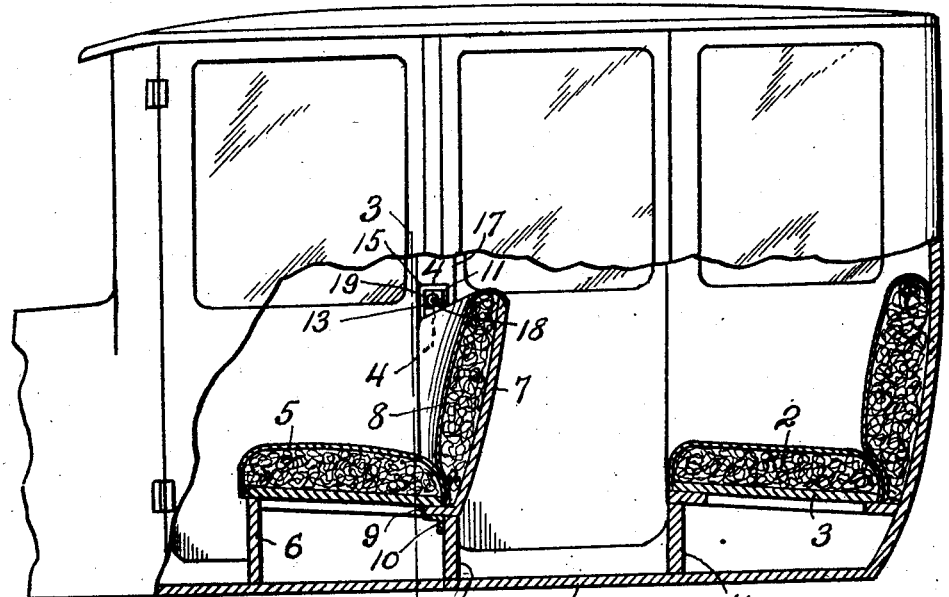
Fig. 2 is a vertical sectional view of a portion of an automobile body, of the type shown in Fig. 1, provided with our improvement, the front seat back being shown in the reclining position and arranged to form, with the front seat and back seat cushions, a bed.

Fig. 4 is an enlarged sectional view on the line 4—4 of Fig. 1.

Fig. 5 is a section on the line 5—5 of Fig. 4.

Fig. 6 is a perspective view of one of the attaching members and of a plate adapted to co-operate therewith and shown separated therefrom.

Similar reference characters designate similar parts in the different views.

1 designates the body of a closed car of usual type having therein a back seat provided with the usual seat cushion 2, provided with the ordinary supporting frame 3 which rests upon a box 4.

Within the body 1 is provided a front seat having the usual removable seat cushion 5, which may rest upon a support comprising a box 6, such as is commonly provided in cars of this type.

The front seat is provided with a seat back having the usual frame 7, having mounted on its forward side the usual cushion 8.

Different means may be employed for supporting the lower edge of the frame 7. In the form of our invention shown, the lower edge of the frame 7 is provided with a forwardly projecting ledge portion 9, upon which the cushion 5 is adapted to rest, and which rests upon and is removable from the upper edge of the rear side of the box 6.

To hold the lower edge of the front seat back from rearward movement when the seat back is in the upright position, shown in Fig. 1, angle plates 10 are fastened to the under side of the ledge portion 9 and are adapted to be disposed within the box 6 and to engage the front side of the rear portion of the box, as is shown in Figs. 1 and 3.

For releasably securely fastening the front seat back to the inner opposite sides of the body 1, two rectangular flat plates 11 are respectively fastened, as by screws 12, to the upper portions of the opposite ends of the frame 7, so as to project above the upper edge of the seat back. Each plate 11 is provided with a transverse recess having an angular extension, said recess comprising, preferably, a transverse edge slot 13, in the front edge of the plate, the rear end of said slot having an upward extension 14, Fig. 6, said slot being disposed in that portion of the plate 11 which projects above the upper edge of the seat back, as shown in Figs. 1 to 4.

Two attaching members, preferably comprising two rectangular plates 15 thereby clamping the front seat back to the body and preventing spreading of the latter, are respectively fastened, as by screws 16, to opposite inner sides of the body, preferably to the door posts 17.

The attaching plates 15 are each provided with an inwardly extending threaded stud 18, said studs being disposed above the upper edge of the front seat back and adapted to enter respectively the slots 13 and to extend therethrough, and to pass into the slot extensions 14 when the front seat back is moved to the upright position and then lowered to the upright operative position in which it will rest upon the box 6, as shown in Figs. 1 and 3. By disposing the attaching plates 11 and 15 above the upper edge of the seat back, the plates 15 may be attached to the door posts and the parts are disposed so as not to catch the clothes of or injure the occupants of the seat.

Two nuts 19 are adapted to be removably mounted respectively upon the studs 18 and to be tightened so as to tightly respectively bear against the plates 11, so as to clamp the latter against the plates 15.

When it is desired to utilize the seat back of the front seat to form, with the seat cushions 2 and 5, a bed, the nuts 19 are loosened, the cushion 5 moved forwardly off from the ledge 9, and the front seat back is lifted and then swung rearwardly at its upper edge, so that the studs 18 will pass from the slot extensions 14 and out of the slots 13. The released seat back may then be disposed so as to have the frame 7 resting upon the box 6 and upon the front portion of the rear seat frame 3, as shown in Fig. 2. The front seat cushion 5 may then be slid rearwardly into contact with the adjacent edge of the reclining seat back.

In these positions cushions 2, 5 and 8, will form a comfortable bed.

To restore the seat back to its upright position, the cushion 5 is again moved forwardly, following which the frame 7 is swung upwardly upon the box 6 until the studs 18 respectively enter and pass to the rear of said slots following which the frame 7 is lowered so as to permit the studs 18 entering the slot extensions 14, and to permit the angle plates 10 to enter the box 6, as shown in Fig. 1. The cushion 5 is then moved rearwardly into contact with the cushion 8, thereby holding the frame from forward movement at its lower edge.

The nuts 19 are then tightened against the plates 11, thereby securely clamping the front seat back in its upright operative position to the door posts 17 and enabling it to serve as an interior transverse brace connecting opposite sides of the body 1.

We do not limit our invention to the structure shown and described, as many modifications, within the scope of the appended claims, may be made without departing from the spirit of our invention.

What we claim is:

1. The combination with an automobile body, of a seat back vertically slidably pivotally mounted therein, an attaching member fastened to the inner side of said body and having an inwardly extending threaded stud, a plate fastened to said seat back and having a transverse edge slot provided with an upwardly extending angular extension, said stud being adapted to enter said slot and to pass into said extension when the seat back is moved to an upright position and then lowered, and a nut adapted to be mounted on said stud and to bear against the inner side of said plate.

2. The combination with an automobile body, of a seat therein having an opening, a member fastened to said body having an inwardly extending stud, a seat back extending into and vertically slidable and pivotally mounted in said opening, and adapted to be swung from an upright position resting on said seat to a rearward horizontal position, and a plate fastened to said back and having in its forward edge a slot having an upwardly extending extension, said stud being adapted to enter said slot and to pass into said upwardly extending extension thereof, when the back is swung to the upright position and then lowered.

3. The combination with an automobile body, of a seat back movable on said body to an upright position and to a horizontal position, and being provided with a plate having a slot extending rearwardly from its front edge and having at its rear end an upward extension, means on said body by which said seat back may be supported in either the upright or the horizontal position, and a stud fastened to the body and extending inwardly therefrom and adapted to enter said slot and to pass into said extension of the slot when the seat back is moved forwardly to the proper position and then lowered.

4. The combination with an automobile body, of a seat back movable on said body to an upright position and to a horizontal position, and provided with a plate having a slot extending rearwardly from the front edge of the plate and having at its rear end an upward extension, means on said body by which said seat back may be supported in either the upright or the horizontal position, and a threaded stud fastened to and extending inwardly from the body and adapted to enter said slot and to pass into said extension when the seat back is moved forwardly to the proper position and then lowered, and a nut on said stud adapted to bear against the inner side of said plate when the latter has said stud extended through said slot.

In testimony whereof I have signed my name to this specification.

GEORGE F. TRAUTWEIN.

In testimony whereof I have signed my name to this specification.

CLARENCE J. WALKER.